F. GILARSKI.
COLLAPSIBLE LIFE NET.
APPLICATION FILED JUNE 30, 1920.
1,360,924.
Patented Nov. 30, 1920.
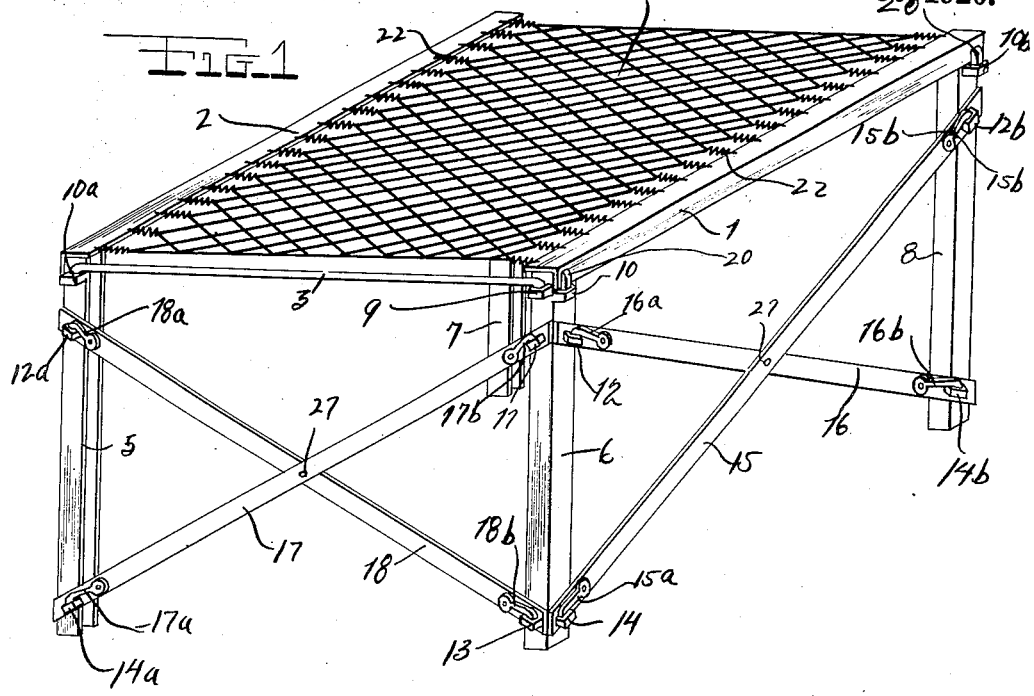
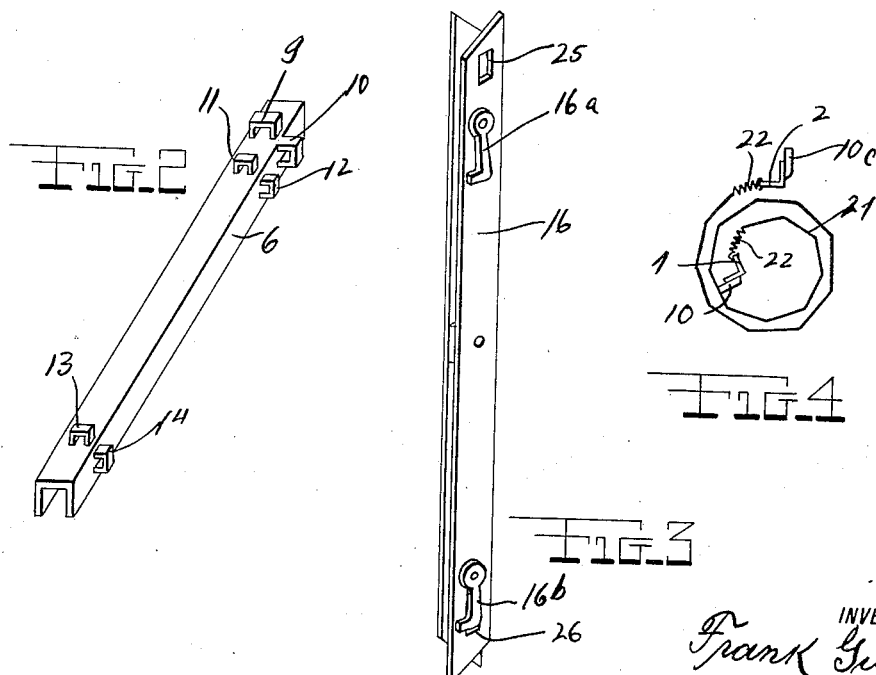
INVENTOR
Frank Gilarski
ATTORNEY

UNITED STATES PATENT OFFICE.

FRANK GILARSKI, OF CHICAGO, ILLINOIS.

COLLAPSIBLE LIFE-NET.

1,360,924. Specification of Letters Patent. Patented Nov. 30, 1920.

Application filed June 30, 1920. Serial No. 393,006.

*To all whom it may concern:*

Be it known that I, FRANK GILARSKI, a citizen of Poland, and resident of Chicago, in the county of Cook and State of Illinois, have invented certain new and useful Improvements in Collapsible Life-Nets, of which the following is a specification.

This invention relates to life nets, and has for its main object to provide a collapsible life net which may be collapsed into a small volume for transportation. The structure of the device is such that it may also be used as a portable bed.

The above and other objects will become apparent in the description below, in which characters of reference refer to like-named parts in the drawings.

Referring briefly to the drawings, Figure 1 is a perspective view of my device assembled, some of the cross braces being omitted for the sake of clearness.

Fig. 2 is a perspective view of one of the legs thereof.

Fig. 3 is a perspective view of two of the cross-braces folded together.

Fig. 4 is a profile view of the net collapsed and rolled up.

Referring now in detail to the drawings, the numeral 1 represents one of the horizontal frame members and 2 the opposite one, and 3 one of the other mutually opposite members, the other of said last-named opposite members not being shown, the same being concealed behind the net 21. The supporting legs are indicated at 5, 6, 7, and 8.

Each leg is constructed as shown in Fig. 2, that is, with a pair of eyelets 9 and 10 on adjacent sides thereof near the top, and another similar pair just below the first, at 11 and 12. Similarly, a pair of eyelets 13 and 14 are located near the bottom of the leg. Cross braces 15, 16, 17, and 18, as shown, join the ends of the legs 5, 6, and 8; similar braces, not shown, join the legs 5, 7, and 8. Each brace comprises, as shown in Fig. 3, a pair of recesses 25 and 26 at the ends of the leg, adapted to be engaged by eyelets 12 and $14^b$ on the leg members 6 and 8 respectively; and a pair of pivoted hooks adapted to engage said eyelets in order to lock the braces in position.

A net 21 is stretched between the frame members 1 and 2, being held by flexible ties 22 to said members. The manner of assembling the device is apparent from Fig. 1, showing how the lugs 20 engage the eyelets 10, $10^a$, and $10^b$; how the hooks $16^a$, $16^b$, engage the eyelets 12 and $14^b$ respectively; how the hooks $15^a$ and $15^b$ engage the eyelets 14 and $12^b$, respectively; how the hooks $17^a$ and $17^b$ engage the eyelets $14^a$ and 11, respectively; how the hooks $18^a$ and $18^b$ engage the eyelets $12^a$ and 13, respectively. Similarly, the frame members 3 and 1 rest respectively in the eyelets 9 and $10^a$, 10 and $10^b$, in order to bind together the upper ends of the legs. The braces themselves are joined at 27.

Thus it is apparent that I have provided a collapsible life net or bed, which may be readily dismantled for the purpose of moving it about. In Fig. 4 is shown the manner in which the net 21 is rolled up. the frame members 1 and 2 being inseparable therefrom, thereby simplifying the dismantling or assembling of the device.

I claim:

A device of the class described comprising leg supports therefor, a pair of eyelets at the top of each of said legs, another pair of eyelets a short distance below said first pair, a third pair of eyelets at the bottom of each leg, horizontal frame members adapted to engage said top-most eyelets, cross-braces mounted in pairs on each side of the device, said braces having recesses adapted to receive the remainder of said eyelets therein and pivoted hooks thereon adapted to engage said remaining eyelets, the said braces of each pair being pivotally attached to each other and a net stretched between said horizontal frame members.

Signed at Chicago, in the county of Cook and State of Illinois this 7th day of June, A. D. 1920.

FRANK GILARSKI.